United States Patent [19]

Bromer

[11] 3,897,551

[45] July 29, 1975

[54] IODOGLUCAGONS AND PROCESS FOR PROLONGING THE BIOLOGICAL ACTIVITY OF GLUCAGON

[75] Inventor: William W. Bromer, Indianapolis, Ind.

[73] Assignee: Eli Lilly and Company, Indianapolis, Ind.

[22] Filed: Mar. 1, 1973

[21] Appl. No.: 337,264

Related U.S. Application Data

[63] Continuation-in-part of Ser. No. 131,438, May 5, 1971, abandoned.

[52] U.S. Cl. ............................. 424/177; 260/112.5
[51] Int. Cl.² ...................................... C07C 103/52
[58] Field of Search .................. 260/112.5; 424/177

[56] References Cited

UNITED STATES PATENTS

| | | | |
|---|---|---|---|
| 3,642,763 | 2/1972 | Wunsch et al. | 260/112.5 |
| 3,715,434 | 2/1973 | Mende | 260/112.5 |
| 3,773,744 | 11/1973 | Bromer et al. | 260/112.5 |

*Primary Examiner*—Elbert L. Roberts
*Attorney, Agent, or Firm*—William C. Martens, Jr.; Everet F. Smith

[57] ABSTRACT

The biological activity of glucagon is prolonged by administering glucagon which has been iodinated to contain an average of from about 1 to about 5 gram atoms of non-radioactive iodine per mole of glucagon.

7 Claims, No Drawings

IODOGLUCAGONS AND PROCESS FOR PROLONGING THE BIOLOGICAL ACTIVITY OF GLUCAGON

CROSS-REFERENCE

This is a continuation-in-part of my co-pending application Ser. No. 131,438, filed Apr. 5, 1971, now abandoned.

BACKGROUND OF THE INVENTION

In 1923 a hyperglycemic factor was observed in extracts of pancreas by Kimbal and Murlin, J. Biol. Chem. 58, 337 (1923–24), who named it glucagon. Subsequent research efforts resulted in the purification and crystallization of the factor by Staub et al., Science, 117, 628 (1953); J. Biol. Chem. 214, 619 (1955). Structurally, glucagon is a single polypeptide chain of 29 amino acids. The amino acid sequence of glucagon was established by Bromer et al., J. Am. Chem. Soc. 79, 2807 (1957).

As already noted, glucagon exhibits a hyperglycemic effect, or a rise in blood glucose. In this respect, glucagon is in dynamic opposition to insulin which exhibits a hypoglycemic effect, or a reduction in blood glucose.

Glucagon, moreover, has been shown to exhibit a variety of other biological actions, particularly a positive inotropic effect; Farah and Tuttle, J. Pharmacol. Exptl. Therap. 129, 49 (1960). Thus, administration of glucagon has been shown to produce an increase in the contractile force of the heart of this subject. This has led to an extensive use of glucagon in the treatment of hypodynamic heart disorders in which an increase in cardiac contractile force is required; Van der Ark et al., Amer. Heart J. 79, 481 (1970).

The marked biological activity of glucagon has led to its use both in treatment of hypoglycemic conditions and in altering and/or control of heart function. Additionally, it has been recognized that glucagon exhibits various other kinds of biological activity. Glucagon is active, for example, as a diuretic, as a bronchodilator, in reducing gut motility and gastric secretion, and in reducing the level of blood lipids and blood cholesterol. These recognized practical uses of the biologically active glucagon have created interest in enhancing the biological activity of glucagon with respect to its duration of effect. It is to this end that the present invention is directed.

It has now been discovered that the biological effect of glucagon can be prolonged if the glucagon has been chemically modified by the addition of iodine.

Iodoglucagons are recognizedly old compounds. However, the iodoglucagons of the prior art have been restricted to glucagon modified by the addition of a minimal quantity of radioactive iodine, sufficient only to render the presence of the radioactive iodine detectable. Thus, "tagged" $^{125}$I-glucagons and $^{131}$I-glucagons have previously been used. These compounds, however, have been limited strictly to application as physiologic tracers and trace-labelled hormones in radioimmune assays. Furthermore, they have been prepared to contain only very minimal quantities of radioactive iodine ($^{131}$I and $^{125}$I), well below one gram atom of radioactive iodine per mole of glucagon. Iodoglucagon has not previously been recognized as a chemical modification of glucagon having prolonged biological activity relative to natural glucagon.

The discovery of the present invention takes on added significance by reason of the fact that it is known that other biologically active proteins lose their activity upon being iodinated. For example, the activity of insulin is rapidly destroyed during iodination, and especially as the extent of iodination increases beyond one gram atom of iodine per mole of insulin; see K. Brunfeldt et al., Acta Endocrinology 57, 307, (1968). The prolonged activity of iodoglucagon over that of natural glucagon is thus entirely unexpected.

SUMMARY OF INVENTION

It is an object of this invention to provide a composition of matter which exhibits a prolonged biological activity when compared with the biological activity of glucagon itself. Furthermore, it is an object of the present invention to provide a process for prolonging the biological activity of glucagon.

By this invention is provided a composition of matter comprising glucagon which has been iodinated to contain an average of from about 1 to about 5 gram atoms of non-radioactive iodine per mole of glucagon.

In accordance with the process aspect of this invention, there is defined a process for prolonging the biological activity of glucagon, which comprises administering to a subject in need of glucagon, glucagon which has been iodinated to contain an average of from about 1 to about 5 gram atoms of non-radioactive iodine per mole of glucagon, said subject being administered an amount of iodinated glucagon within the usual dosage range of natural glucagon and by any mode available for administering natural glucagon.

In more specific embodiments, the present invention provides a composition of matter which comprises an iodinated glucagon, and a process for prolonging the biological activity of glucagon, which comprises administering and iodinated glucagon, in which the glucagon contains an average of from about 2 to about 4 gram atoms of non-radioactive iodine per mole of glucagon.

DETAILED DESCRIPTION

The glucagon molecule contains two tyrosine residues in its amino acid sequence. It is believed that these residues are the principal points at which iodination takes place. Tyrosine is itself known to react rapidly with conventional iodinating agents, forming first 3-iodotyrosine, and then 3,5-diiodotyrosine. A similar reaction is believed to occur with respect to glucagon with the iodination modifying the tyrosine residues present therein. It should be noted, however, that it is not intended that the present invention be restricted to any particular theory of point of reaction, reaction mechanism or product structure with respect to the glucagon modification.

By the phrase "glucagon which has been iodinated with non-radioactive iodine to contain", "iodinated glucagon", or any other phrase of like import, is meant a glucagon which has been chemically modified such that substantially all of the iodine which is present in the glucagon composition both is non-radioactive (that is, $^{127}$I, and not $^{131}$I or $^{125}$I) and is chemically bonded to a glucagon molecule.

The method of carrying out the iodination of glucagon is not critical to a statement of the present invention. Any suitable reagent effective to accomplish the addition of iodine is satisfactory. Suitable iodinating agents include iodine monochloride, potassium triiodide, a combination of an iodide salt and chloramine T, etc. A preferred iodinating reagent is iodine monochloride. Under the selected conditions of reaction, the iodination will normally be stoichiometric. Therefore, only sufficient iodinating reagent necessary to accomplish the intended extent of iodination of the glucagon will generally be employed.

The temperature and pressure at which the iodination reaction is carried out is not critical with the exception that the temperature must not be so high as to cause decomposition of the glucagon. Generally, room temperature or lower is employed, with a temperature of from −10°C. to +10°C. being especially preferred. The iodination will ordinarily be carried out at atmospheric pressure, although superatmospheric pressures are also satisfactory.

Likewise, a solvent is not a critical part of the iodination reaction. Any reaction medium which is inert to the reactants may be used, and the iodination, moreover, may be carried out with the relatively insoluble glucagon being present in the medium in the form of a suspension.

The pH of the reaction medium also is not critical. The iodination can be carried out in an acidic, neutral or alkaline medium; however, it is preferred to iodinate the glucagon at conditions which are slightly alkaline, generally at about a pH of 7.5–9.0.

The time of reaction will be that which is long enough to assure completion of the intended extent of iodination. The time of reaction, of course, will vary greatly depending upon the other selected reaction conditions.

One aspect of this invention is a process for prolonging the biological activity of glucagon. Preferably, the iodine-modified glucagon is administered to a subject exhibiting hypoglycemia or to a subject in need of increased cardiac contractile force.

The dosage level of the iodine-modified glucagon which is administered to the subject will be measured in terms of the usual natural glucagon dosage. Thus, the iodine-modified glucagon dosage generally will be within the range of from about 0.1 to about 100 µg. per kg. body weight of the recipient.

Furthermore, the dosage may be single or cumulative. By cumulative is meant a dosage measured in terms of multiple individual smaller doses, each individual dose being administered before completion of the subject's response to the previous dose.

Iodinated glucagon is administered using the same methods available for administration of glucagon. These include all the usual parenteral routes, for example, intravenous, intraperitoneal, subcutaneous and intramuscular. In comparing the biological activity of glucagon with that of iodinated glucagon, both must be administered by the same method since, in general, intravenous administration provides a more rapid onset with a shorter duration; intraperitoneal is intermediate; and subcutaneous or intramuscular injection produces a relatively slower onset with longer duration.

The following examples illustrate the modification of glucagon to produce iodinated glucagon and demonstrate the prolonged biological activity of iodinated glucagon compared with natural glucagon.

EXAMPLE I 350 mg. of crystalline glucagon (100 micromoles) was dissolved at 0°C. and at a concentration of 5 mg. per milliliter in 0.2 M glycine-HCl buffer at a pH of 3.0. To the glucagon solution, a 0.2 M solution of 0.8 millimoles iodine monochloride (ICl) was added dropwise and with stirring over a period of about 5 minutes. After an additional 3 minutes the excess $I_2$ was destroyed by addition of 50 µl mercaptoethanol. The solution was immediately passed over a 5 × 60 cm. column of Sephadex G-10 in 1 M. acetic acid. The initial UV-absorbing fraction from the effluent, free of electrolytes, was lyophilized, yielding 280 mg. (80 percent yield) of white iodinated glucagon containing 3.96 gram atoms of iodine per mole.

EXAMPLE II

Glucagon in an amount of 20 µmoles was suspended in 4 ml. of a 0.05 M citrate-phosphate buffer at 0°C. and pH 6.0. To the stirred suspension was added 80 µmoles of ICl. The suspension was then stirred at 4°C. until the pale yellow color of $I_2$ disappeared. The reaction mixture was dialyzed for 24 hours versus two changes of 1,000 volumes of 0.01 M ammonium acetate at pH 5.0. The resulting white precipitate inside the dialysis bag was collected by centrifugation, dissolved in 1 M acetic acid and passed through a 2.5 × 60 cm. column of G-10 Sephadex. The protein fraction was lyophilized, providing a 90 percent yield of iodinated glucagon containing 3.5 gram atoms of iodine per mole.

EXAMPLE III

Crystalline glucagon in an amount of 5 micromoles was dissolved in 5 M guanidine-HCl at 0°C. The pH of the solution was adjusted to 8.5 by the addition of 0.2 M glycine buffer. A solution of 20 micromoles ICl was added to the glucagon solution in small increments from a microburet over a period corresponding to one equivalent of iodine per 5 minutes. No excess $I_2$ was observed by starch test. During the reaction, the pH of the solution was maintained at 8.0–8.5 by addition of buffer. The reaction mixture was then immediately dialyzed for 16 hours at 4°C. versus 1,000 volumes of 0.1 M acetate buffer at pH 5.0. Within 30 minutes a heavy white precipitate appeared inside the Visking membranes. The contents of the dialysis bag were lyophilized and the dry powder was dissolved in 1 M acetic acid and passed through a 2.5 × 60 cm. column of G-10 Sephadex. The protein fraction was lyophilized, producing iodinated glucagon containing approximately 4 gram atoms of iodine per mole.

Comparative Biological Activity of Iodoglucagon and Natural Glucagon

A. Cardiac contractile force and heart rate.

The biological activity of iodoglucagon was compared with that of natural glucagon with respect to cardiac contractile force and heart rate.

Four dogs were used as test animals. The dogs were anesthetized with phenobarbital, vagotomized, and prepared for monitoring heart rate and cardiac contractile force. Cumulative dose responses were obtained, and the parameters were measured at varying intervals for three hours subsequent to administering the last dose of each glucagon preparation. In cumulative dosing, no delay is experienced waiting for the completion of the response to the previous dose. Instead, as soon as the response to the immediately previous dose reached a plateau, another dose was administered, and this was continued until the subject had received the cumulative amount. The testing was carried out in two segments. In the first segment two of the dogs received natural glucagon while the other two received iodoglucagon. In the second segment the same procedure was used except that the two dogs which received natural glucagon in the first segment then received iodoglucagon, and vice versa.

The iodoglucagon used in this demonstration of comparative biological activity contained about 4 gram atoms of iodine per mole of glucagon. Tables I and II depict the results which were obtained. Table I demonstrates the biological potency of iodine-modified glucagon compared with natural glucagon. Table II demonstrates the marked prolongation of biological activity of glucagon when it has been iodine-modified.

TABLE I

RELATIVE POTENCY OF NATURAL GLUCAGON AND IODOGLUCAGON

| Cumulative Dose µg./Kg. | ΔHeart Rate, beats/minute | | ΔContractile Force, mm. | |
|---|---|---|---|---|
| | $G^a$ | $IG^b$ | G | IG |
| 0.5 | + 2 | + 2 | 0.0 | 0.0 |
| 1 | + 5 | + 5 | +0.2 | 0.0 |
| 2 | +10 | + 10 | +0.5 | +0.4 |
| 4 | +30 | + 32 | +2.0 | +2.0 |
| 8 | +55 | + 60 | +3.3 | +4.3 |
| 16 | +70 | + 85 | +4.1 | +5.7 |
| 32 | +82 | +100 | +4.6 | +6.3 |

$^a$Natural glucagon
$^b$Iodoglucagon

TABLE II

PROLONGED EFFECT OF IODOGLUCAGON RELATIVE TO NATURAL GLUCAGON AT 32 µg/kg CUMULATIVE DOSE

| Time, Minutes | Heart Rate, Percent of Max.$^a$ | | Contractile Force, Percent of Max.$^a$ | |
|---|---|---|---|---|
| | $G^b$ | $IG^c$ | G | IG |
| 5 | 95 | 98 | 85 | 98 |
| 10 | 91 | 100 | 43 | 92 |
| 20 | 72 | 97 | − 8 | 68 |
| 30 | 45 | 90 | −13 | 50 |
| 40 | 25 | 85 | −17 | 38 |
| 50 | 10 | 80 | −18 | 28 |
| 60 | 3 | 73 | −15 | 23 |
| 90 | 2 | 62 | −22 | 10 |
| 120 | 4 | 60 | −20 | 7 |
| 180 | 3 | 52 | −12 | 0 |

$^a$Maximum response from Table I
$^b$Natural glucagon
$^c$Iodoglucagon

B. Hyperglycemia

Table III depicts the effect of natural glucagon and I-, I₂-, I₃-, I₄- and I₅-glucagon on the amount of glucose present in the blood of rabbits at varying times up to 4 hours after injection with the glucagon or iodine-modified glucagon sample. Each of the rabbits was pretreated with cortisone and then subcutaneously injected with 8 µg. per kg. of glucagon or modified glucagon. The results provide a clear demonstration of the prolonged hyperglycemic effect of iodine-modified glucagon when compared with natural glucagon. The data in Table III also give indication that the prolongation of hyperglycemic effect is directly proportional to the extent of iodination.

TABLE III

HYPERGLYCEMIC EFFECT

| Time, Hours After Injection | Mean Rise in Blood Glucose, mg. per 100 ml.* | | | | | |
|---|---|---|---|---|---|---|
| | G (104) | IG (16) | $I_2G$ (32) | $I_3G$ (48) | $I_4G$ (80) | $I_5G$ (64) |
| 0.5 | 124 | 129 | 143 | 137 | 146 | 136 |
| 1 | 147 | 185 | 212 | 220 | 220 | 224 |
| 2 | 55 | 114 | 190 | 248 | 255 | 264 |
| 4 | −10 | 6 | 23 | 60 | 94 | 159 |

*The number appearing in parenthesis refers to the number of rabbits tested.

In the above table, G refers to glucagon, IG to monoiodoglucagon, $I_2G$ to diiodoglucagon, $I_3G$ to triiodoglucagon, $I_4G$ to tetraiodoglucagon, and $I_5G$ to pentaiodoglucagon.

C. Depression of Blood Amino Acids

Another method for comparing the duration of action of various glucagon preparations involves their depression of blood amino acids, Bromer and Chance, Diabetes 18, 748 (1969). The effects of glucagon and tetraiodoglucagon were compared in fed rabbits at subcutaneous doses of 50 µg. per kg., and the results are given in Table IV. The effect of iodination of glucagon on the prolongation of biological action is again evident.

Table IV

DEPRESSION OF BLOOD AMINO ACIDS

| Time, Hours After Injection | Blood Amino Acids, % of initial concentration* | | |
|---|---|---|---|
| | Saline (16) | Glucagon (10) | $I_4$ glucagon (10) |
| 0 | 100 | 100 | 100 |
| 1 | 93 | 57 | 47 |
| 3 | 90 | 68 | 41 |
| 5 | 85 | 87 | 47 |

*The number appearing in parenthesis refers to the number of rabbits tested.

It can thus be determined from the above that a marked improvement in the biological activity of glucagon is achieved by a chemical modification of its structure to incorporate therein up to about 5 gram atoms of iodine.

I claim:

1. A composition of matter comprising glucagon which has been iodinated to contain an average of from about 1 to about 5 gram atoms of non-radioactive iodine per mole of glucagon.

2. Composition of claim 1, in which the glucagon has been iodinated to contain an average of from about 2 to about 4 gram atoms of non-radioactive iodine per mole of glucagon.

3. Process for prolonging the biological activity of glucagon, which comprises administering to a subject in need of glucagon, glucagon which has been iodinated to contain an average of from about 1 to about 5 gram atoms of non-radioactive iodine per mole of glucagon, said glucagon being administered parenterally and in an amount within the range of from about 0.1 to about 100 µg. per kilogram body weight of said subject.

4. Process of claim 3, in which the iodinated glucagon is administered to a subject exhibiting hypoglycemia or to a subject in need of increased cardiac contractile force.

5. Process of claim 4, in which the iodinated glucagon contains an average of from about 2 to about 4 gram atoms of iodine per mole of glucagon.

6. Process of claim 5, in which the iodinated glucagon is administered to a subject exhibiting hypoglycemia.

7. Process of claim 5, in which the iodinated glucagon is administered to a subject in need of increased cardiac contractile force.

* * * * *